Sept. 30, 1941.         O. F. RUSSELL              2,257,653
          MOTOR SYNCHRONIZER FOR MOTOR DRIVEN SKATES
                  Filed March 19, 1941         2 Sheets-Sheet 1
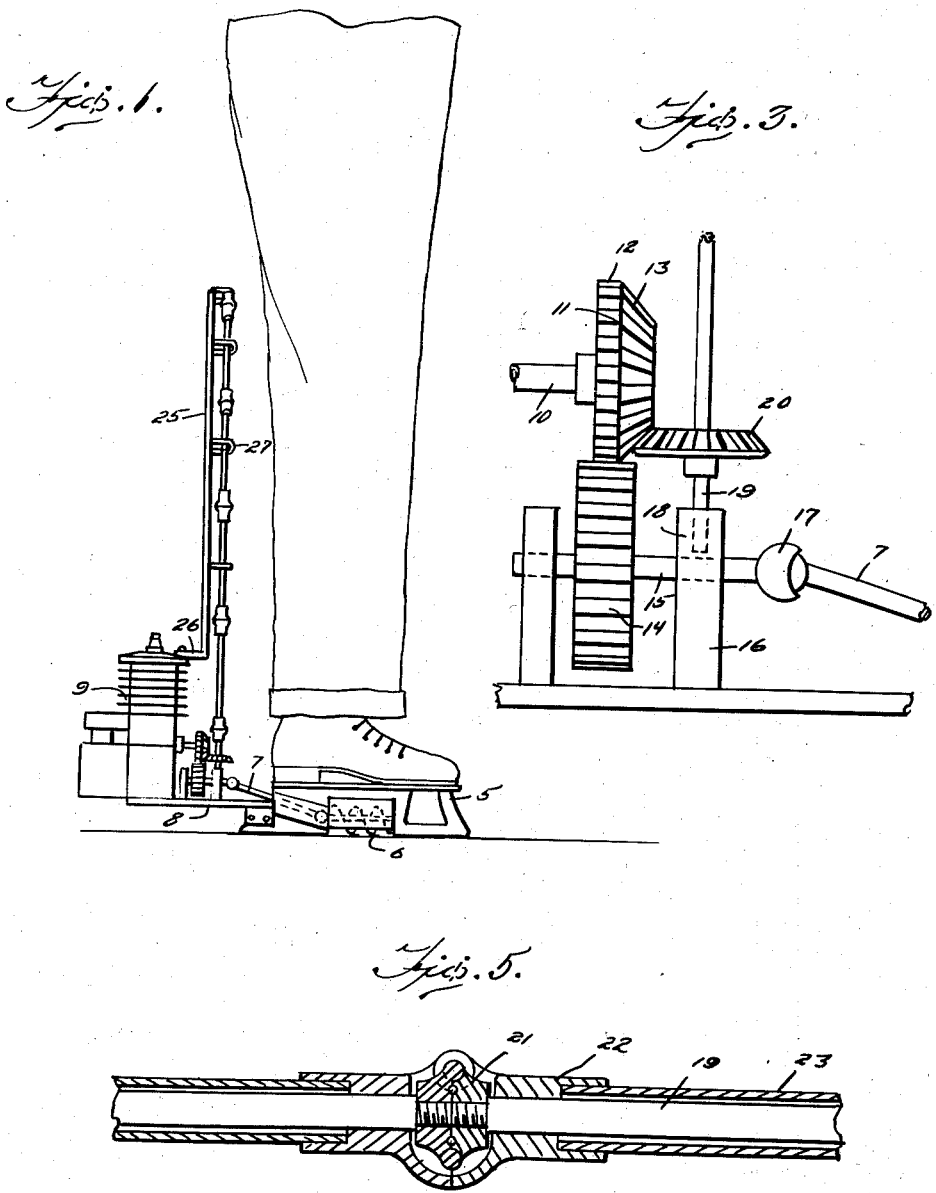
Inventor
Oren F. Russell
By  Clarence A. O'Brien
Attorney

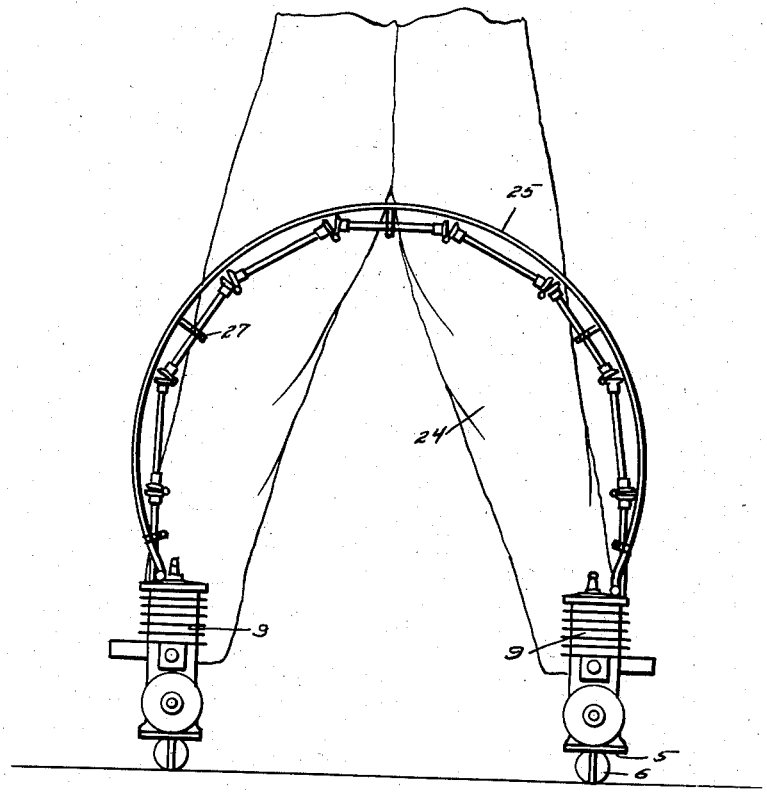
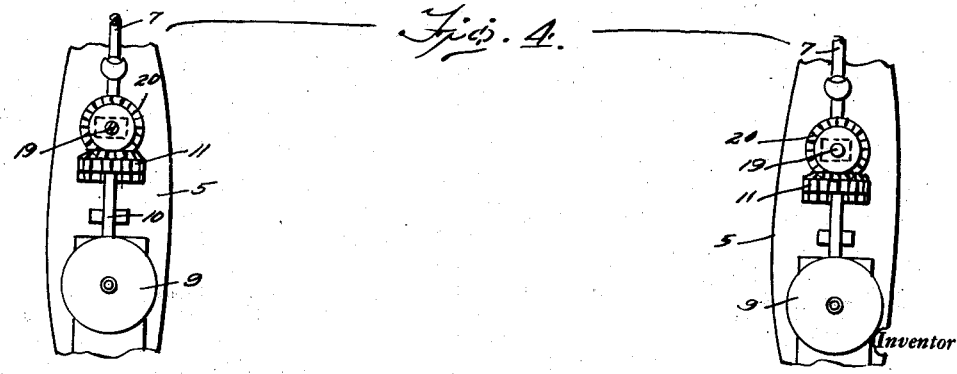

Patented Sept. 30, 1941

2,257,653

UNITED STATES PATENT OFFICE 2,257,653

MOTOR SYNCHRONIZER FOR MOTOR DRIVEN SKATES

Oren F. Russell, Palmer, Wash.

Application March 19, 1941, Serial No. 384,220

3 Claims. (Cl. 60—97)

The present invention relates to new and useful improvements in drive connections for the drive shaft of a plurality of power plants, such as the motors employed for driving a pair of skates, and has for its primary object to provide means for synchronizing the speed of the drive shaft of the two motors for uniformly driving the skates.

A further object is to provide a device of this character of simple and practical construction, which is efficient and reliable in performance, relatively inexpensive to manufacture and install in operative position, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which—

Figure 1 is a side elevational view of the drive connection for the motors of a pair of skates, Figure 2 is a rear elevational view, Figure 3 is a detail of the drive gear connection for the drive shaft of the motors, Figure 4 is a top plan view of the pair of skates with the gears for the synchronous drive connection therefor, and Figure 5 is a fragmentary longitudinal sectional view through one of the hinged sections for the flexible drive shaft.

Referring now to the drawings in detail, wherein for the purpose of illustration I have disclosed a preferred embodiment of the invention, the numerals 5—5 designate a pair of ice skates adapted to be driven by a spiral screw 6 by means of a shaft 7 projecting rearwardly from the skates.

Also projecting from the rear end of the skate is a motor platform 8 on which the power plant, such as an internal combustion engine 9, is operatively mounted. One end of the crank shaft 10 projects forwardly of the motor and on which is secured a gear 11, the gear being provided with a plurality of gear teeth, including a set of spur gear teeth 12 and a set of bevel gear teeth 13. The gear teeth 12 are engaged with a gear 14 secured to a shaft 15 which is journalled in upstanding brackets 16 rising from the platform 8, the shaft 15 being operatively connected with the shaft 7 through a universal joint 17.

The upper end of one of the brackets 16 is formed with a socket 18 within which is journalled the lower end of a flexible drive shaft 19 and secured on the shaft 19 is a bevel gear 20 which is engaged with the bevel teeth 13 of the gear 11.

The flexible drive shaft 19 is of conventional construction and includes a plurality of shaft sections connected by gear units 21, the shaft sections being journalled in the hingedly connected sections 22 of a shaft housing 23.

The ends of the flexible shaft 19 connect the respective motors 9—9, the flexible shaft being curved upwardly and across the backs of the legs 24 of a person, the shaft being supported by a bow-shaped support 25 having its ends secured to the respective motors 9 as shown at 26. At spaced intervals the bow-shaped support 25 is provided with attaching loops 27 through which the flexible shaft 19 is inserted.

From the foregoing it will be apparent that if one motor is operated at a speed in excess of the other motor, that the flexible shaft 19 will provide an operative connection between the two motors so that the spiral screws 6 of the respective skates will be driven at a uniform speed.

It is believed the details of construction, advantages and manner of use of the device will be readily understood from the foregoing without further detailed explanation.

Having thus described the invention, what I claim is:

1. A synchronizer for a plurality of motors comprising a flexible shaft having its ends connected to the drive shafts of the respective motors and means for supporting the flexible shaft at an intermediate point between the motors.

2. In combination, a pair of motors mounted on individual supports, a drive shaft for each motor, a flexible shaft, means operatively connecting the flexible shaft to each of the drive shafts and a bow-shaped support attached to each motor and supporting the intermediate portion of said flexible shaft.

3. In combination, a pair of motors mounted on individual supports, a drive shaft for each motor, a flexible shaft, a gear at each end of the flexible shaft, gears on the drive shafts operatively engaged with the respective gears of the flexible shaft and a bow-shaped support having its ends attached to the motors and having its intermediate portion freely attached to the intermediate portion of the flexible shaft for supporting the latter.

OREN F. RUSSELL.